United States Patent [19]

Balkanli

[11] 4,157,535

[45] Jun. 5, 1979

[54] DOWN HOLE PRESSURE/TEMPERATURE GAGE CONNECT/DISCONNECT METHOD AND APPARATUS

[75] Inventor: Hayati Balkanli, Houston, Tex.

[73] Assignee: Lynes, Inc., Houston, Tex.

[21] Appl. No.: 799,014

[22] Filed: May 20, 1977

[51] Int. Cl.[2] .......................... G01V 1/40; E21B 27/06

[52] U.S. Cl. .............................. 340/18 CM; 166/250; 175/50; 340/18 P; 340/16 C

[58] Field of Search .......... 340/18 CM, 18 FM, 18 P, 340/18 LD, 16 C; 166/0.6, 64, 66, 250; 175/24, 48, 50

[56] References Cited

U.S. PATENT DOCUMENTS

| | | | |
|---|---|---|---|
| 3,284,669 | 11/1966 | Boyd | 340/18 CM |
| 3,293,607 | 12/1966 | Kalbfell | 340/18 FM |
| 3,638,174 | 1/1972 | Haase | 340/16 C |
| 3,723,956 | 3/1973 | Carman | 340/16 C |
| 3,737,845 | 6/1973 | Maroney et al. | 340/18 P |
| 3,742,440 | 6/1973 | Ehrlich et al. | 340/16 C |
| 3,959,767 | 5/1976 | Smither et al. | 340/18 LD |
| 3,991,611 | 11/1976 | Marshall et al. | 340/18 CM |

*Primary Examiner*—Howard A. Birmiel

*Attorney, Agent, or Firm*—William C. Norvell, Jr.

[57] ABSTRACT

A method and an apparatus for connecting a gage to an oil well pump power cable for transmitting pressure and temperature data to a surface recorder whereby the gage can be selectively disconnected when it is desired to test the insulation integrity of the pump power supply system, and selectively connected when the test is completed. The gage is connected to the neutral point of the three phase motor winding through a latching relay. A code transmitter generates a frequency coded signal on the pcwer cable to a decoder which controls the relay. The same coded signal is utilized to open and close the relay contacts as desired.

1 Claim, 6 Drawing Figures

DOWN HOLE PRESSURE/TEMPERATURE GAGE CONNECT/DISCONNECT METHOD AND APPARATUS

BACKGROUND OF THE INVENTION

1. Field of the Invention

This invention relates in general to frequency coded signaling systems and in particular to a connect/disconnect system for a pressure/temperature gage in an oil well.

2. Description of the Prior Art

After an oil well has been drilled, a pump and pump motor must be installed to pump the oil to the surface. In order to prevent damage to the pumping equipment and the loss of oil, it is important to monitor the pressure and the temperature in the well. This has been accomplished by installing a pressure/temperature gage in the well and connecting it to a surface recorder. In a polyphase power supply system such as a three phase "Y" connected system, the gage is connected to the neutral point of the motor winding and the recorder is connected to the neutral point of the power transformer secondary with the circuit completed through the system ground. This configuration protects the gage-recorder circuit but does not protect the pump motor from a line-to-ground fault and does not allow the power supply system to be tested periodically for faults. The only prior art alternative is the use of a separate line to connect the gage and the recorder.

SUMMARY OF THE INVENTION

This invention relates to a method and an apparatus for selectively connecting a pressure/temperature gage to or disconnecting the gage from the power supply system for an oil well pump motor. Such a method and apparatus provides for the transmission of pressure and temperature data to a surface recorder and provides means for disconnecting the gage when it is desired to test the power supply system such as for insulation integrity. A three phase power source is coupled to one end of a power cable through a supply transformer. The other end of the power cable is connected to the winding of a three phase motor to supply power thereto and the gage is connected to the neutral point of the motor winding through a pair of relay contacts. When the relay contacts are closed, the gage sends pressure and temperature data from the oil well through the power cable to a surface recorder. The recorder is AC wise isolated from the power supply system by coupling to the power cable through a three phase inductor. Such coupling isolates the recorder from any line-to-line and line-to-ground faults which may occur in the power supply system.

A decoder and disconnect relay circuit is coupled to the pump motor winding and responds to a coded signal for controlling the relay contacts to connect the gage to or disconnect the gage from the neutral point of the motor winding. A code transmitter is coupled to the recorder site of the inductor for generating the coded signal. The coded signal is formed by generating three different frequency sine wave forms at different times. A predetermined number of cycles of each frequency must be received by the decoder before the state of the relay contacts is changed.

The code transmitter is activated to form each of the sine waves from a square wave pulse train of frequency f0 generated by a crystal controlled pulse generator. A first counter is responsive to the pulse train to divide its frequency by N1 and generate a pulse train of frequency f1. A wave shaper circuit shapes the f1 frequency pulse train into a sine wave of the same frequency. This sine wave is transmitted on the power cable for a period of time determined by counting a first predetermined number of the f1 frequency pulse train pulses. A period during which no signal is generated is determined by counting a second predetermined number of the f1 frequency pulse train pulses. A second counter is responsive to the f0 frequency pulse train to divide its frequency by N2 and generate a pulse train of frequency f2 and a third counter is responsive to the f0 frequency pulse train to divide the frequency by N3 and generate a pulse train of frequency f3. A pair of wave shaper circuits shape the f2 and f3 frequency pulse trains into sine waves having the respective frequencies. The code transmitter alternately transmits these sine waves for an equal number of equal length periods to complete the coded signal.

The decoder and disconnect relay circuit includes a band pass filter and a counter responsive to the f1 frequency sine wave for enabling the circuitry for changing the state of the relay contacts. An individual band pass filter and associated counter for each of the f2 and f3 frequency sine waves generates a pulse for each period of the corresponding frequency sine wave which is received. A pair of counters are responsive to respective ones of the pulses for counting the number of periods received and actuating the relay driving circuit when the coded signal is complete. The relay driving circuit changes the state of the relay contacts and remains latched until the next coded signal is received.

It is an object of the present invention to reduce the cost and improve the reliability of an oil well pressure and temperature monitoring system by eliminating an external wire connection between the pressure/temperature gage and the surface recorder.

It is also an object of the present invention to protect an oil well pump motor from line-to-ground faults when utilizing the power cable to connect a pressure/temperature gage to a recorder.

It is another object of the present invention to protect an oil well pressure/temperature gage connected to the pump motor power cable during an insulation integrity test of the power supply system.

DESCRIPTION OF THE PREFERRED EMBODIMENT

Figure 1:
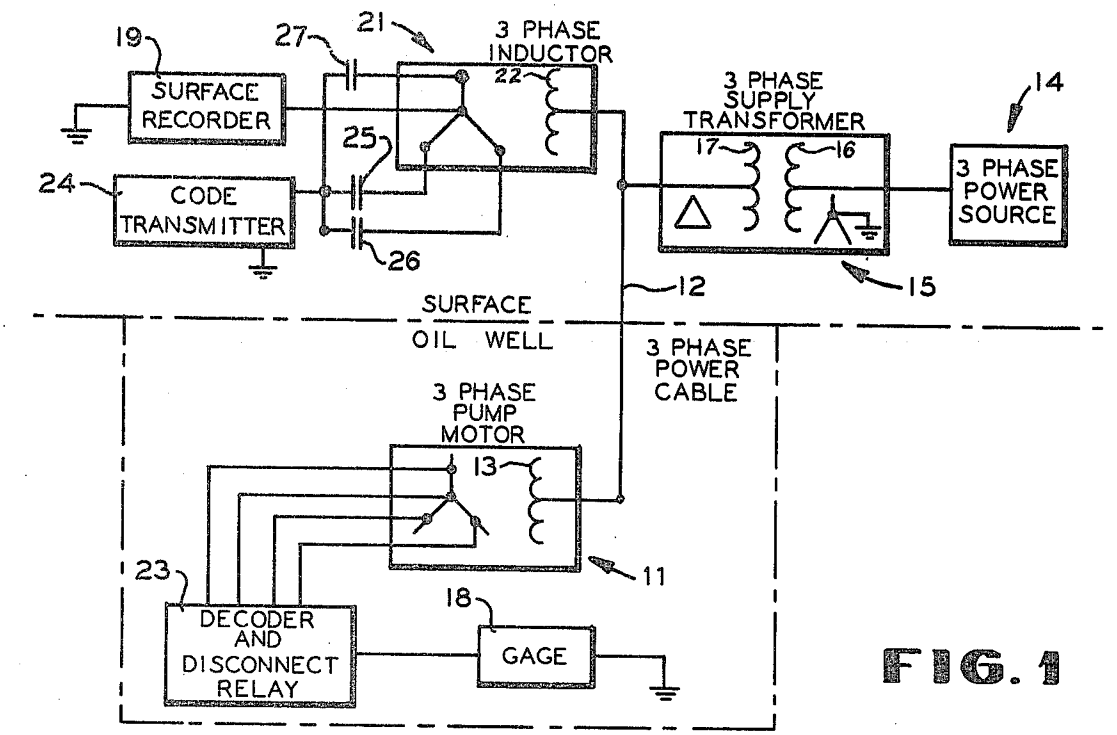
FIG. 1 is a block diagram of a down hole pressure/-temperature gage connect/disconnect system according to the present invention.

There is shown in FIG. 1 a block diagram of a down hole pressure/temperature gage connect/disconnect system according to the present invention. A three phase pump motor 11 is positioned in an oil well for pumping oil to the surface. Power is supplied to the motor through a three phase power cable 12 having one end connected to a winding 13 of the motor 11 and another end connected to a three phase power source 14 through a three phase supply transformer 15. A primary winding 16 of the transformer can be "Y" connected with a neutral point connected to the system ground potential. A secondary winding 17 of the transformer 15 can also be "Y" connected with a floating neutral point or can be delta connected, as shown, without a neutral point.

A pressure temperature gage 18 is positioned for detecting the pressure and temperature levels in the oil well and transmitting this data over the power cable 12 to a recorder 19 on the surface. The recorder is AC wise isolated from the power cable 12 by a three phase inductor 21 having a winding 22 connected to the power cable 12. The winding can be "Y" connected with the recorder 19 connected between a neutral point of the winding and the system ground potential. This coupling prevents the formation of sizeable line-to-ground fault currents should a fault occur in the power supply circuit. The connection between the gage 18 and the recorder 19 is completed from a neutral point of the motor winding 13 through a decoder and disconnect relay circuit 23. The circuit 23 includes a pair of relay contacts (not shown) which are closed to connect the gage 18 to the motor winding 13 when it is desired to transmit the pressure and temperature data over the power cable 12. The gage 18 is connected between the circuit 23 and the system ground potential to complete the electrical circuit to the recorder 19.

A code transmitter 24 is coupled to the three legs of the inductor winding 22 through three capacitors 25, 26, and 27. The transmitter generates a coded signal which includes three frequencies and is coupled through the capacitors 25, 26, and 27 to the power cable 12. The decoder and disconnect relay circuit 23 is coupled to a tap point on each leg of the motor winding 13 to receive the coded signal from the power cable 12. When it is desired to test the insulation integrity of the pump motor power supply circuit, an apparatus commonly known as a "Megger" is connected to any conductor of the power cable 12. The "Megger" is capable of generating a relatively high magnitude a.c. voltage such as 2000 volts. In order to protect the gage 18 during this testing, the code transmitter 24 is actuated to generate the coded signal. The decoder and disconnect relay circuit 23 responds to the coded signal by opening the relay contacts to disconnect the gage 18 from the neutral point of the motor winding 13. When the test is completed, the code transmitter 24 can again be actuated to generate the coded signal and the circuit 23 will respond by closing the relay contacts to reconnect the gage 18 to the neutral point of the motor winding 13.

Figure 2:
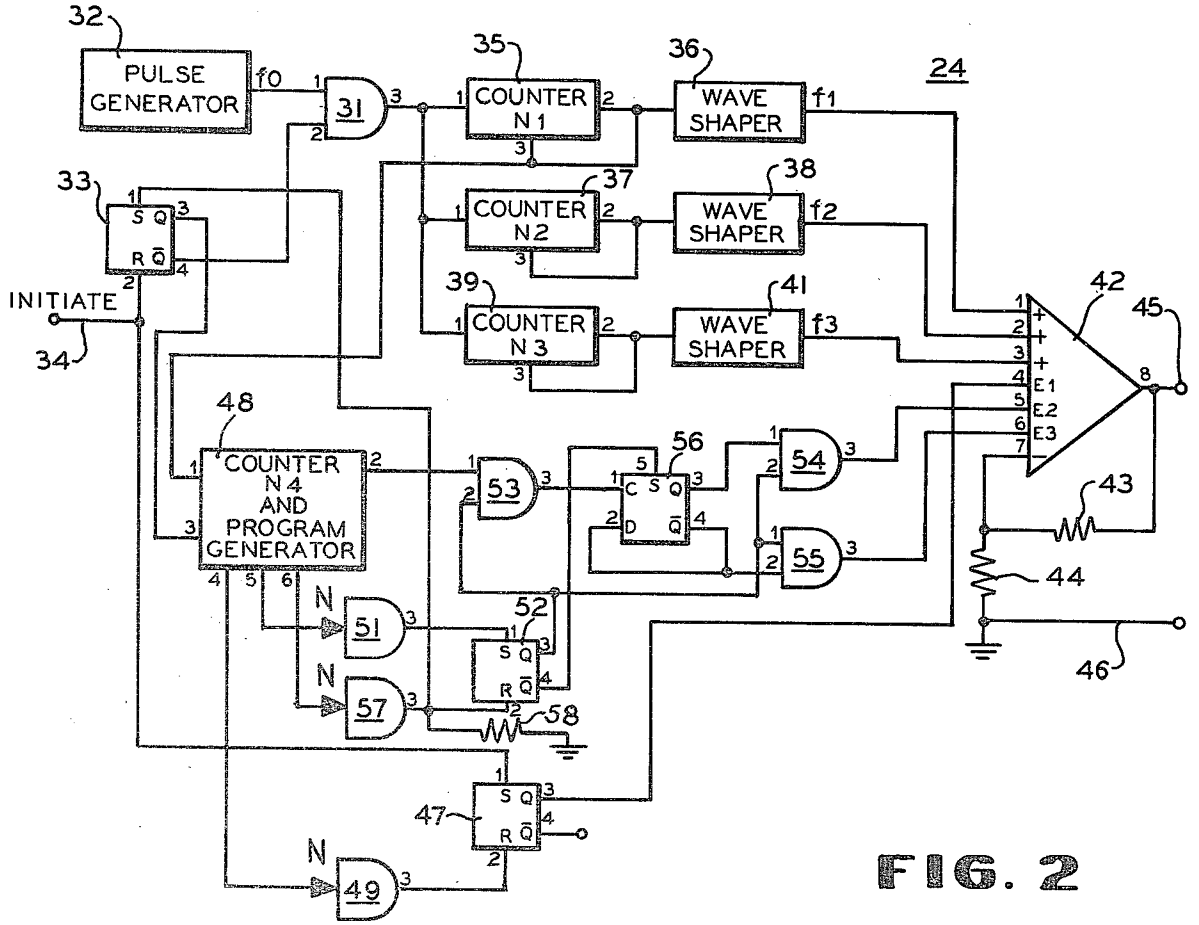
FIG. 2 is a schematic diagram of the code transmitter of FIG. 1.
Figure 3:
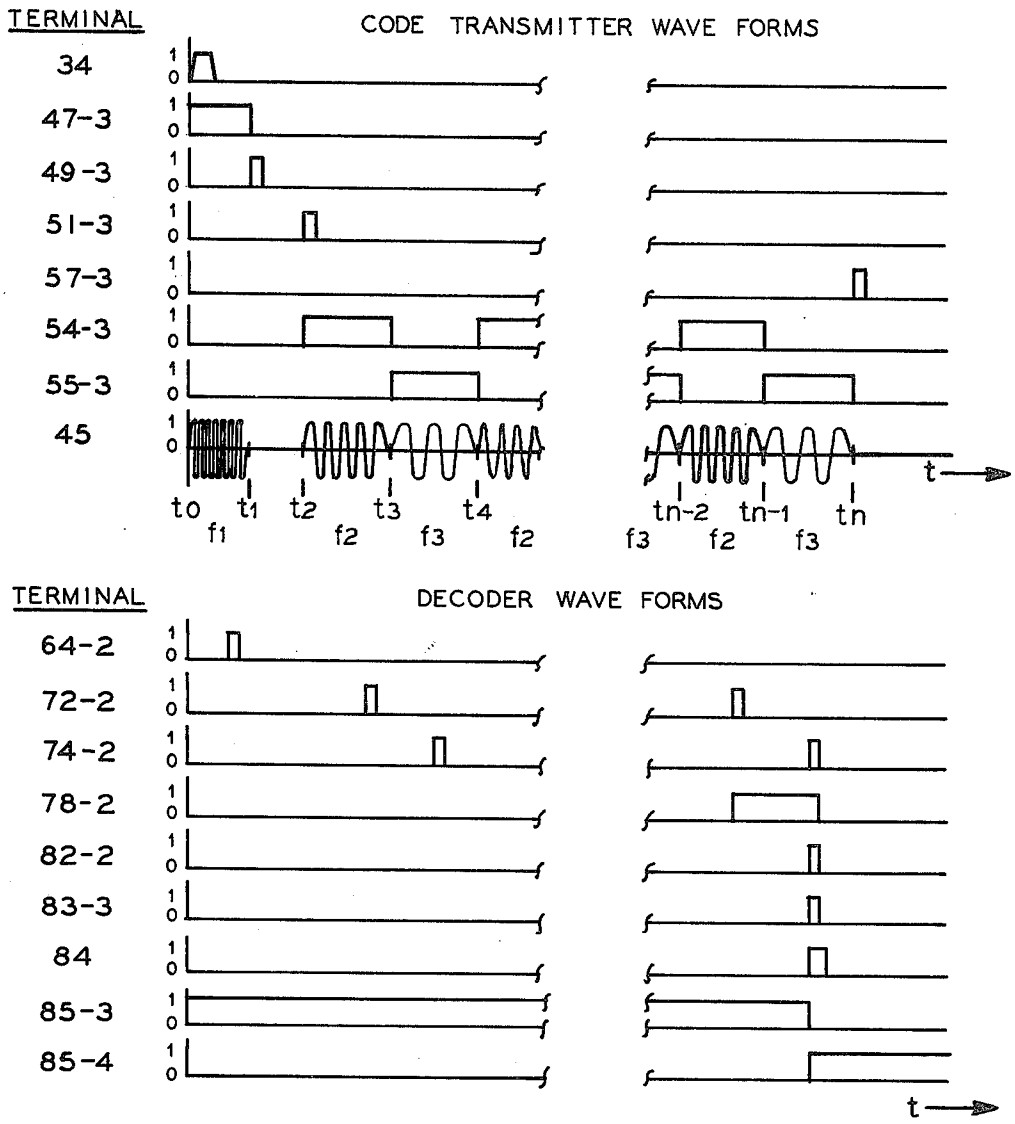
FIG. 3 is a timing diagram of the signals generated in the code transmitter of FIG. 2 and the decoder and disconnect relay circuit of FIG. 6.
Figure 4:
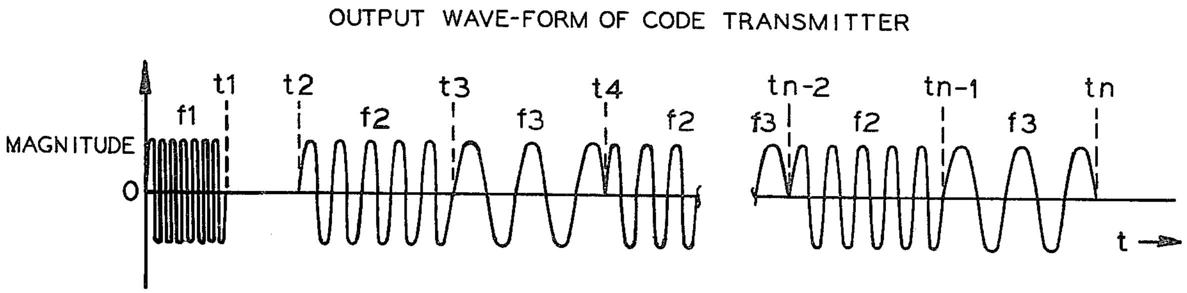
FIG. 4 is a wave form diagram of the output signal generated by the code transmitter of FIG. 2.

There is shown in FIG. 2 a schematic diagram of the code transmitter 24 of FIG. 1. An initiating signal is applied to the transmitter to generate the coded signal which is shown in FIG. 4 as individual periods of generation of sinusoidal wave forms at three different frequencies. FIG. 3 shows a timing diagram of the signals generated in the code transmitter. In describing these signals, a "1" will represent a logic true signal and a "0" will represent the absence of logic "1." Any circuit element having more than two terminals will have those terminals numbered and referred to by the circuit element reference numeral followed by a dash and the terminal number such as a terminal 31-1 of an AND-gate 31.

A pulse generator 32 generates a continuous train of alternating "1" and "0" pulses at an output connected to the input 31-1 of the AND-gate 31. The generator is crystal controlled for generating the pulse train at a frequency f0 with a stability of approximately 0.05%. The AND-gate 31 also has an input 31-2 which is connected to the complementary output 33-4 of an RS (reset-set) flip flop 33. An AND-gate will generate a "1" at an output when its inputs are at "1" and will generate a "0" for any other combination of input signals. Therefore, if a "1" is applied to the input 31-2, the pulse train at the input 31-1 will be generated at an output 31-3.

The flip flop 33 also has a set input 33-1, a reset input 33-2 and a noninverting output 33-3. A "1" at the set input 33-1 will set the output 33-3 to "1" and the output 33-4 to "0." A "1" at the reset input 33-2 will reset the output 33-3 to "0" and the output 33-4 to "1." An initiate input line 34 is connected to the reset input 33-2. When it is desired to generate the coded signal, a "1" pulse is applied to the line 34 by any suitable means such as the closing of a switch connected between a positive potential power supply and the line 34. The leading edge of the "1" pulse resets the flip flop 33 to generate a "1" at the output 33-4 to enable the AND-gate 31 which generates the pulse train at the output 31-3.

The output 31-3 is connected to an input 35-1 of a counter 35 having an output 35-2 connected to a wave shaper circuit 36 and to its own reset input 35-3 of the counter. Each "1" pulse of the pulse train is counted by the counter 35 until a predetermined number of pulses N1 has been counted whereupon the counter generates a "1" at the output 35-2. The "1" at the output resets the counter to zero to terminate the "1" pulse. The "1" pulse is also applied to the wave shaper circuit 36 which shapes the square wave pulse into a sine wave. Since the counter divides the frequency f0 of the pulse generator pulse train by N1, the sine wave output of the wave shaper circuit 36 will have a frequency f1 which is a fraction 1/N1 of the frequency f0.

The output 31-3 is also connected to an input 37-1 of a counter 37 having an output 37-2 connected to a wave shaper circuit 38 and to its own reset input 37-3. Each "1" pulse of the pulse train is counted by the counter 37 until a predetermined number of pulses N2 has been counted whereupon the counter generates a "1" at the output 37-2. The "1" at the output resets the counter to zero to terminate the "1" pulse. The "1" pulse is also applied to the wave shaper circuit 38 which shapes the square wave pulse into a sine wave. The output from the wave shaper circuit 38 will have a frequency of f2 which is a fraction 1/N2 of the frequency f0. The output 31-3 is connected to an input 39-1 of a counter 39 having an output 39-2 connected to a wave shaper circuit 41 and to its own reset input 39-3. The counter 39 divides the pulse generator pulse train frequency by a predetermined number N3 and the wave shaper circuit 41 generates a sine wave at a frequency f3 which is a fraction 1/N3 of the frequency f0.

The outputs of the wave shaper circuits 36, 38 and 41 are connected to three noninverting inputs 42-1, 42-2 and 42-3 respectively of an amplifier 42. The amplifier 42 can be selectively enabled to amplify a signal applied to any one of the inputs and generate the amplified signal at an output 42-8. There are three enable inputs 42-4, 42-5 and 42-6 which correspond to the inputs 42-1, 42-2 and 42-3 respectively. For example, if a "1" signal is applied to the enable input 42-4, the signal at the input 42-1 will be amplified. An inverting input 42-7 is connected to the output 42-8 through a feedback resistor 43 and to the system ground potential through a resistor 44. The values of the resistor 43 and 44 determine the gain of the amplifier 42. The output 42-8 is connected to the capacitors 25, 26, and 27 of FIG. 1 by an output line 45 and the ground potential side of the code transmitter circuit 24 is connected to the system ground by an output line 46.

The initiate line 34 is also connected to a set input 47-1 of an RS flip flop 47 having a noninverting output 47-3 connected to the enable input 42-4 of the amplifier 42. When the "1" signal is applied to the line 34 to enable the AND-gate 31, the flip-flop 47 is set to generate a "1" at the input 42-4 to enable the amplifier 42 to generate the sine wave signal of frequency f1 at the output 42-8. The output 35-2 of the counter 35 is also connected to an input 48-1 of a counter and program generator 48 having a set of outputs 48-4 connected to the decoding inputs 49-N of an AND-gate 49. The set of outputs 48-4, although shown as a single line, represents N lines on all of which there is generated a "1" after a first predetermined number of pulses have been counted at the frequency f1. When all of the inputs to the AND-gate 49 are at "1," a "1" is generated at an output 49-3 connected to a reset input 47-2 of the flip-flop 47. The flip flop resets the output 47-3 to "0" to disable the amplifier 42 and terminate the generation of the sine wave at the output 42-8. Thus, the sine wave of frequency f1 has been generated for a period of time ending at t1 as shown in FIG. 3.

The counter 48 has another set of outputs 48-5 connected to the decoding inputs 51-N of an AND-gate 51. The set of outputs 48-5 is similar to the output 48-4 in that it represents several lines on all of which there is generated a "1" after a second predetermined number of pulses have been counted, the second predetermined number being larger than the first predetermined number. When all of the inputs to the AND-gate 51 are at "1," a "1" is generated at an output 51-3 which is connected to a set input 52-1 of an RS flip flop 52. The flip flop has a noninverting output 52-3 connected to an input 53-2 of an AND-gate 53, to an input 54-2 of an AND-gate 54 and to an input 55-1 of an AND-gate 55. The flip flop 52 also has a complementary output 52-4 connected to a set input of a D-type flip flop 56. Another input 53-1 of the AND-gate 53 is connected to an output 48-2 of the counter 48. The counter 48 generates a pulse train having a frequency which is a fraction 1/N4 of the frequency f1 of the pulse train from the counter 35 at the output 48-2. The "1" generated by the AND-gate 51 sets the flip flop output 52-3 to "1" to enable the AND-gate 53 to generate the pulse train from the counter 48 at an output 53-3 which is connected to a clock (c) input 56-1 of the flip flop 56.

The D-type flip flop 56 also has a data (D) input 56-2 connected to a complementary output 56-4 which enables it to perform a toggling function. For every "1" signal applied to its clock input 56-1, the outputs 56-3 and 56-4 will sequentially become "1." When the flip flop 52 is set, a "1" will be generated at the output 52-3 to enable the AND-gates 53, 54, and 55. This will permit the transmission of the clock pulses from the output 53-3 to the clock input 56-1 of the flip flop 56. Since the gates 54 and 55 are enabled, their outputs 54-3 and 55-3 will sequentially become "1" by the signals coming from the flip flop 56 outputs 56-3 and 56-4. The AND-gate 54 has an output 54-3 connected to the enable input 42-5 of the amplifier 42. With both inputs at "1," a "1" will be generated at the output 54-3 to enable the amplifier 42 to generate the f2 frequency sine wave at the output 42-8. The generation of the f2 frequency signal begins at time t2 with no output signal generated between t1 and t2 as shown in FIG. 3, this delay representing the time required to generate the number of pulses equal to the difference between the first predetermined number and the second predetermined number of pulses decoded by the gates 49 and 51.

When the flip flop 56 was set, the output 56-4 was set to "0". This output is connected to an input 55-2 of the AND-gate 55 and an output 55-3 of the AND-gate 55 is connected to the enable input 42-6 of the amplifier 42. The first "0" to "1" transition of the signal at the clock input 56-1 will transfer the "0" at the data input 56-2 to the output 56-3 and generate a "1" at the output 56-4. Now the AND-gate 54 generates a "0" at the enable input 42-5 and the AND-gate 55 generates a "1" to enable the amplifier 42 to generate the f3 frequency sine wave at the output 42-8. The generation of the f3 frequency signal begins at time t3 as shown in FIG. 3, the time between t2 and t3 representing the time required to generate the number of pulses equal to the difference between the second predetermined number of pulses and the next integer multiple of N4 pulses.

The next "0" to "1" transition at the clock input 56-1 will transfer the "1" at the data input 56-2 to the output 56-3 and the amplifier 42 will return to the generation of the f2 frequency sine wave signal. This alternation between the f2 frequency and the f3 frequency sine waves will continue until a third predetermined number of pulses have been counted by the counter 48. A set of outputs 48-6 are connected to the inputs 57-N of an AND-gate 57. The set of outputs 48-6 are similar to the outputs 48-4 in that it represents one or more different lines on all of which there is generated a "1" after the third predetermined number of pulses have been counted, the third predetermined number being larger than the second predetermined number. When all of the inputs to the AND-gate 57 are at "1," a "1" is generated at an output 57-3 which is connected to a reset input 52-2 of the flip flop 52. The "1" at the reset input resets the output 52-3 to "0" to disable the AND-gates 53, 54 and 55 and resets the output 52-4 to "1" to remove the set signal from the set input 56-5 of the flip flop 56. The output 57-3 is also connected to the set input 33-1 of the flip flop 33. When the "1" is generated, the output 33-4 will be set to "0" to disable the AND-gate 31 and the output 33-3, which is connected to a reset input 48-3 of the counter 48, will reset that counter to zero. Thus, the code transmitter 24 is turned off and requires the application of a "1" pulse on the initiate line 34 to be turned on. A resistor 58 is connected between the output 57-3 and the system ground potential to define a "0" signal level and prevent transient voltages from resetting the flip flop 52 or setting the flip flop 33 while the coded signals is being generated.

In summary, the code transmitter 24 includes a pulse generator 32 for generating a square wave pulse train with a frequency f0. When an initiate signal is applied to the code transmitter, the f0 frequency pulse train is applied to three counters, each counter dividing the frequency f0 by a different integral number to define pulse trains having the frequencies f1, f2 and f3. Each pulse train is applied to a wave shaper circuit which shapes the square waves into a sine wave form. The initiate signal enables the amplifier 42 to generate the f1 frequency sine wave form on an output line 45 which is coupled to the power cable 12 of FIG. 1. The f1 frequency pulse train is also applied to a fourth counter and program generator 48 which disables the amplifier 42 after a first predetermined number of the pulses are counted at a time t1 subsequent to the application of the initiate pulse.

At a time t2, after a delay during which no signal is generated on the output line 45, the counter 48 will have counted a second predetermined number of pulses and will enable the amplifier to generate the f2 frequency sine wave form on the output line 45. The counter 48 also divides the f1 frequency pulse train by N4 integral number to generate a pulse train to alternately enable the amplifier 42 to generate the f2 frequency and f3 frequency sine wave forms. After a third predetermined number of the f1 pulse train pulses have been counted, the amplifier 48 is disabled and the pulse train generated by the pulse generator 32 is removed from the inputs of the first three counters to terminate the generation of the coded signal on the output line 45.

Figure 5:
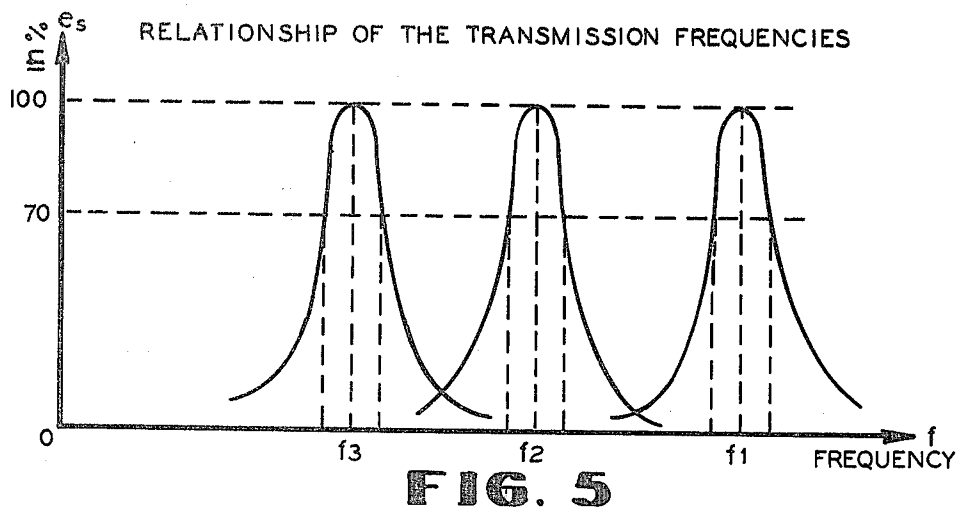
FIG. 5 is a magnitude versus frequency plot of the output signal generated by the code transmitter of FIG. 2.

FIG. 4 is an enlarged wave form diagram of the output signal generated by the code transmitter 24 and shown in FIG. 3. FIG. 5 is a magnitude versus frequency plot of the same output signal. There are only a few constraints on the coded signal. The frequencies f2 and f3 must not be equal to nor be a subharmonic of the frequency f1 and the frequency f3 must not be equal to nor be a subharmonic of f2. As shown in FIG. 5, the three signals are approximately equal in magnitude with a relatively narrow bandwidth measured at the 70% of maximum magnitude level. This is achieved by the utilization of a crystal controlled pulse generator and relatively high "Q" wave shapers, typically with a "Q" of not less than fifty.

Since the times t1 and t2 are defined by the counter 48, they will coincide with complete cycles of the f1 frequency sine wave. Although no particular times are required, several cycles of the f1 frequency should be generated to reduce the possibility of triggering from a transient generated by the switching on of the pump motor. Furthermore, the time t2 should be delayed long enough after the time t1 to allow the circuits of the decoder 23 to be enabled to respond to the remainder of the coded signal. The periods of generation of the f2 and f3 frequencies are equal and correspond to the amount of time required to generate a predetermined number N4 of the pulses of the f1 frequency pulse train.

Figure 6:
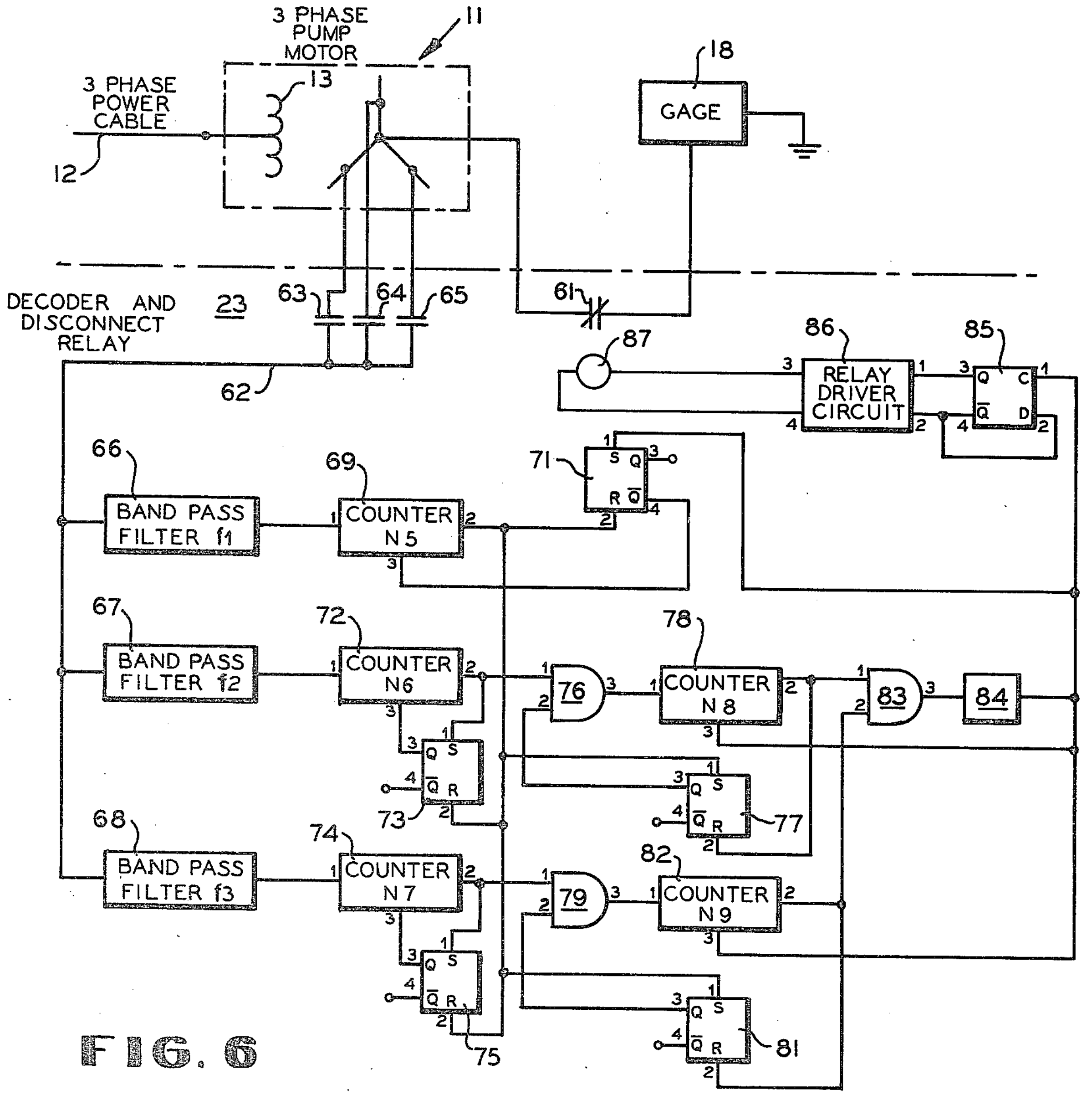
FIG. 6 is a schematic diagram of the decoder and disconnect relay circuit of FIG. 1.

There is shown in FIG. 6 a schematic diagram of the decoder and disconnect relay circuit 23 of FIG. 1. The neutral point of the motor winding 13 is connected to the gage 18 through a pair of relay contacts 61 which are shown in the closed position. Each coil of the three phase motor winding 13 is connected from a tap point to an input line 62 through individual capacitors shown as the capacitors 63, 64 and 65. Since all the lines of the power cable are utilized for carrying the coded signal, a connection is made to each coil of the motor winding so that the motor can be connected to the power cable without a phase restriction due to coded signal.

The input line 62 is connected to an input of each of three band pass filters 66, 67 and 68. The filter 66 responds only to the f1 frequency sine wave portion of the coded signal to generate a square wave pulse train having the frequency f1. The output of the filter 66 is connected to an input 69-1 of a counter 69 having an output connected to a reset input 71-2 of a flip flop 71 and a reset input 69-3 connected to a complementary output 71-4 of the flip flop. The counter 69 counts the f1 frequency pulses until a predetermined number N5 has been counted whereupon the counter generates a "1" at the output 69-2 as shown in FIG. 3. This "1" resets the flip flop output 71-4 to "1" to reset the counter at the reset input 69-3 and terminate the "1" at the output 69-2. Since the f1 frequency pulse train is only generated during the time from the initiation of the coded signal to the time t1, the counter 69 will not receive any more pulses to count. Also, the output pulse of the counter resets the flip flops 73 and 75, and sets the flip flops 77 and 81. This puts all the counters (N6, N7, N8, and N9) into initial state, and makes them ready to count.

An output of the band pass filter 67 is connected to an input 72-1 of a counter 72 having an output 72-2 connected to a set input 73-1 of an RS flip flop 73 and a reset input 72-3 connected to a noninverting output 73-3 of the flip flop 73. The filter 67 responds only to the f2 frequency sine wave portions of the coded signal to generate a square wave pulse train having the frequency f2. The counter 72 counts the f2 frequency pulses until a predetermined number N6 has been counted whereupon the counter generates a "1" at the output 72-2 as shown in FIG. 3. This "1" sets the flip flop output 73-3 to "1" to reset the counter at the reset input 72-3 and terminate the "1" at the output 72-2. The number N6 is selected to be less than the total number of f2 frequency pulses generated during any one period of pulse generation such as the period between the times t2 and t3 so that the counter 72 will always generate the "1" pulse before the end of each period of f2 frequency signal generation.

An output of the band pass filter 68 is connected to an input 74-1 of a counter 74 having an output 74-2 connected to a set input 75-1 of an RS flip flop 75 and a reset input 74-3 connected to a noninverting output 75-3 of the flip flop. The filter 68 responds to the f3 frequency sine wave portions of the coded signal to generate a square wave pulse train having the frequency f3. The counter 74 counts the f3 frequency pulses until a predetermined number N7 has been counted whereupon the counter generates a "1" at the output 74-2 as shown in FIG. 3. This "1" sets the flip flop output 75-3 to "1" to reset the counter at the reset input 74-3 and terminate the "1" at the output 74-2. In a manner similar to the selection of the number N6, the number N7 is selected to be less than the total number of f3 frequency pulses generated during any one period of pulse generation such as the period between the time t3 and the time t4.

The counter output 72-2 is also connected to an input 76-1 of an AND-gate 76. An input 76-2 of the AND-gate 76 is connected to a noninverting output 77-3 of an RS flip flop 77 having a set input 77-1 connected to the counter output 69-2. When the counter 69 generates the "1" pulse, the flip flop output 77-3 will be set to "1" to enable the AND-gate 76 to pass the "1" pulses generated by the counter 72. The AND-gate 76 has an output 76-3 connected to an input 78-1 of a counter 78. The counter also has an output 78-2 connected to a reset input 77-2 of the flip flop 77. The counter 78 counts the pulses generated by the counter 72, one pulse per period, until a predetermined number N8 has been counted whereupon the counter generates a "1" at the output 78-2 as shown in FIG. 3. This "1" resets the flip flop output 77-3 to "0" to disable the AND-gate 76 to prevent the counting of any more pulses by the counter 78.

The counter output 74-2 is also connected to an input 79-1 of an AND gate 79. An input 79-2 of the AND gate 79 is connected to a noninverting output 81-3 of an RS flip flop 81 having a set input 81-1 connected to the counter output 69-2. When the counter 69 generates the "1" pulse, the flip flop output 81-3 will be set to "1" to enable the AND-gate 79 to pass the "1" pulses generated by the counter 74. The AND-gate 79 has an output 79-3 connected to an input 82-1 of a counter 82. The counter also has an output 82-2 connected to a reset input 81-2 of the flip flop 81. The counter 82 counts the pulses generated by the counter 74, one pulse per period, until a predetermined number N9 has been counted whereupon the counter generates a "1" at the output 82-2 as shown in FIG. 3. This "1" resets the flip flop output 81-3 to "0" to disable the AND-gate 79 to prevent the counting of any more pulses by the counter 82.

The counter output 78-2 is connected to an input 83-1 of an AND-gate 83 and the counter output 82-2 is connected to an input 83-2 of the AND-gate 83. After the counters 78 and 82 have reached the N8 and N9 count totals respectively, both inputs to the AND-gate 83 will be at "1" to generate a "1" at an output 83-3. The output 83-3 is connected to an input of a "one shot" or monostable multivibrator 84 which is triggered by the "1" to generate a "1" pulse of a predetermined width as shown in FIG. 3 at an output. The output of the multivibrator 84 is connected to a set input 71-1 of the flip flop 71, a reset input 78-3 of the counter 78 and a reset input 82-3 of the counter 82. The "1" generated by the multivibrator sets the flip flop output 71-4 to "0" to remove the reset pulse from the counter 69 and resets the counters 78 and 82 to zero to prepare the decoder for the next coded signal. The output of the multivibrator 84 is also connected to a clock input 85-1 of a D-type flip flop 85. The flip-flop 85 has a noninverting output 85-3 connected to an input 86-1 of a relay driver circuit 86 and a complementary output 85-4 connected to an input 86-2 of the circuit 86 and to a data input 85-2 of the flip flop 85. The circuit 86 also has a pair of outputs 86-3 and 86-4 connected to a relay coil 87. The circuit 86 responds to a "1" at the input 86-1 to supply power to the coil 87 for a current flow in a direction which will close the relay contacts 61 and responds to a "1" at the input 86-2 to supply power to the coil 87 for current flow in the opposite direction which will open the relay contacts 61. Assuming that the flip flop output 85-3 is at "1" to close the relay contacts as shown in FIG. 6, the flip flop output 85-4 will apply a "0" to the data input 85-2. When the multivibrator 85 generates the "1" pulse, the flip flop 85 will be clocked to transfer the "0" to the output 85-1 and a "1" to the output 85-2. The circuit 86 will respond to the change in its input signal by reversing the current flow in the coil 87 to open the relay contacts 61. The circuit will remain latched by the flip flop 85 until the next coded signal is received and decoded to generate a "1" pulse from the multivibrator 84. The flip flop 85 will be clocked by the "1" pulse to reverse its output signals and the circuit 86 will respond by reversing the current flow in the coil 87 to close the contacts 61.

In summary, the gage 18 is connected to the neutral point of the motor winding 13 through a pair of relay contacts 61. The contacts 61 are open and closed by a bistable latching circuit including the latching flip flop 85, the relay driver circuit 86 and the relay coil 87. The latching circuit is actuated by a decoder circuit which responds to the coded signal generated on the power cable 12 by the code transmitter 24. Each coil of the motor winding 13 is coupled to the decoder through a capacitor. The f1 frequency sine wave is detected and shaped into a square wave pulse train by the band pass filter 66 and the pulses are counted by the counter 69 until N5 pulses have been received. After N5 pulses have been counted, the counter resets itself and enables counters for counting the f2 and f3 frequency pulse trains which are generated from the f2 and f3 frequency sine waves of the coded signal. After N8 of the f2 frequency pulse train periods and N9 of the f3 frequency pulse train periods have been counted, the flip flop 85 is clocked to change the state of the relay contacts. Thus, each time the coded signal is generated, the state of the relay contacts 61 is changed such that the gage 18 can be selectively connected to and disconnected from the neutral point of the motor winding 13.

To summarize, the present invention concerns an apparatus for selectively connecting a gage positioned in an oil well for generating pressure and temperature data to a data transmission line. The transmission line can be a power cable connected between a pump motor positioned in the oil well and a power supply external to the oil well. A recorder external to the oil well can be coupled to the power cable by an inductor for recording the pressure and the temperature data. The inductor protects the recorder from currents generated by line-to-ground or line-to-line faults which could occur.

The apparatus includes means coupled to the transmission line for selectively generating a control signal; a bistable switch means connected between the gage and the transmission line, the switch means being responsive to a switch signal for switching between a first state wherein the gage is connected to the transmission line and a second state wherein the gage is disconnected from the transmission line; and means coupled to the transmission line and connected to the switch means, the means being responsive to the control signal for generating the switch signal. The switch means includes a relay having a pair of contacts connected between the gage and the transmission line. Typically, the motor is three phase with a "Y" winding and the contacts are connected between the gage and the neutral point of the motor winding. The switch means also includes a relay driver circuit for maintaining the contacts in a closed position in response to a first latch signal and for maintaining the contacts in an open position in response to a second latch signal. The switch means further includes latching means connected between the relay driver circuit and the switch signal generating means and responsive to the generation of one of the first and second latch signals and the switch signal for switching to the generation of the other one of the first and second latch signals.

The control signal generating means includes a code transmitter for generating a frequency coded signal as the control signal. The coded signal is an alternating current wave form having a first predetermined frequency during a first predetermined time period, an alternating current wave form having a second predetermined frequency during at least a second predetermined time period subsequent to the first time period and an alternating current wave form having a third predetermined frequency during at least a third predetermined time period. The code transmitter includes a pulse generator time period. The code transmitter includes a pulse generator for generating a continuous square wave pulse train having a fourth predetermined frequency greater than the first, second and third frequencies; counter means for dividing the fourth frequency pulse train by first, second and third predetermined numbers to generate square wave pulse trains having the first, second and third frequencies respectively; means for shaping the first, second and third frequency square wave pulse trains into alternating current sine wave forms having the first, second and third frequencies respectively; and means for selectively connecting the shaping means to the transmission line to generate the frequency coded signal.

The switch signal generating means includes means responsive to the first frequency wave form for generating an enable signal and means responsive to the enable signal and the second and third frequency wave forms for generating the switch signal. The enable signal generating means includes means for counting the number of cycles of the first frequency wave form and for generating the enable signal when a predetermined number of the first frequency cycles have been counted. The enable signal responsive means includes means for counting the number of time periods of each of the second and third frequency wave forms and for generating the switch signal when a second predetermined number of each of the second and third frequency wave form time periods have been counted and the enable signal is being generated. The enable signal responsive means includes means for counting the number of cycles of the second frequency wave form and for generating a first count signal when a predetermined number of the second frequency wave form cycles have been counted during one of the second frequency wave form time periods and includes means for counting the number of cycles of the third frequency wave form and for generating a second count signal when a predetermined number of the third frequency wave form cycles have been counted during one of the third frequency wave form time periods and wherein the time period counting means is responsive to the first and second count signals for counting the number of each of the second and third frequency wave form time periods.

The present invention also concerns a method for selectively connecting a gage positioned in an oil well to a winding of a pump motor wherein the pump motor is positioned in the oil well with a power cable connected between the motor winding and a power supply external to the oil well, a recorder external to the oil well is coupled to the power cable for receiving pressure and temperature data generated by the gage and a switch means is connected between the gage and the motor winding. The method includes the steps of generating a coded control signal on the power cable; decoding the control signal to generate a switch signal; and switching the switch means from one to the other of two stable states in response to the generation of the switch signal, in a first one of the stable states the gage is connected to the motor winding and in a second one of the stable states the gage is disconnected from the motor winding.

Power for the decoder and disconnect relay circuit can be obtained from the power supplied to the pump motor. The electronic elements in the decoder typically require low voltage direct current which can be obtained by rectifying and filtering the three phase alternating current power. The relay driver circuit typically requires the low voltage direct current and either alternating current or high voltage direct current power for the relay coil.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope. For example, the coded signal could be formed with more than or less than three separate frequencies. However, if only one or two frequencies are utilized, transients generated by the switching on or off of the pump motor could actuate the decoder circuit. If more than three frequencies are utilized, the cost of the extra circuitry may outweigh the added protection from spurious signals.

What is claimed is:

1. A method for selectively connecting a gage positioned in an oil well to the actual or virtual neutral of a three-phase pump motor wherein the pump motor is positioned in the oil well with a three-phase power cable connected between the three-phase motor windings and the three-phase power supply external to the oil well, a code transmitter being connected to the virtual neutral of said three-phase power supply, and a recorder external to the oil well being coupled to the three-phase power cable through a three-phase inductor for receiving pressure and temperature data generated by the gage, the switch means being connected between the gage and the actual or virtual neutral point of the three-phase motor, the method comprising the steps of:

generating a coded control signal;

coupling the said signal to the three-phase power cable;

coupling the said signal from the actual or virtual neutral of the three-phase pump motor to a decoder;

decoding said control signal to generate a switching signal for connecting a down hole gage to the actual or virtual neutral of the three-phase of said pump motor; and switching the switch means from one to the other of two stable states in response to the generation of said switch signal, a first one of said states in which the gage is connected to the motor winding and a second one of said states in which the gage is disconnected from the motor winding, said step of decoding the coded signal including the sub-steps of:

coupling any signal which is transmitted through the three-phase power line from the windings of the three-phase power motor to a virtual neutral point of the three-phase motor by a three-phase reactor;

counting the number of positive half cycles of said first frequency alternating current wave form during a predetermined time period up to a predetermined number of half cycles to generate a reset pulse for the decoding circuitry;

counting the number of positive half cycles of said second and third frequency alternating current wave forms during sequentially alternating predetermined time period up to a predetermined number for each frequency to generate a single pulse for each given time period;

counting the numbers of said pulses which are generated during the sequential predetermined time periods and relate to second and third frequencies;

obtaining a pulse from a gate which combines the outputs of the two counters which count the number of sequentially generated predetermined time periods; and manipulating a switch to change the state of the switch when said inable pulse is obtained from the formation of the second and third frequency alternating currents.

* * * * *